April 7, 1970   J. M. BREEN   3,504,414
TOOL FOR INSERTING TIRE STUDS
Filed July 17, 1967
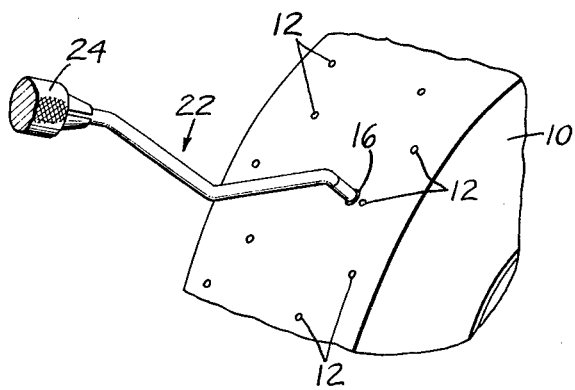
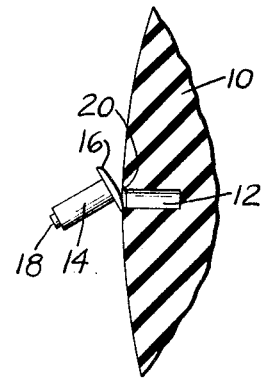
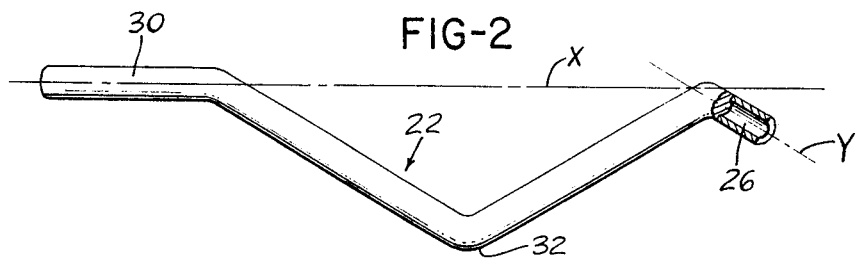
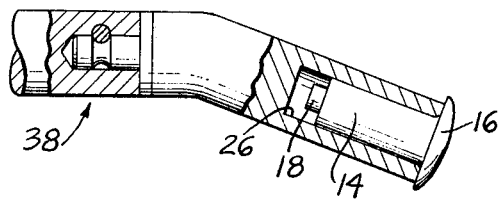
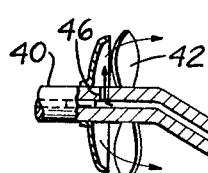
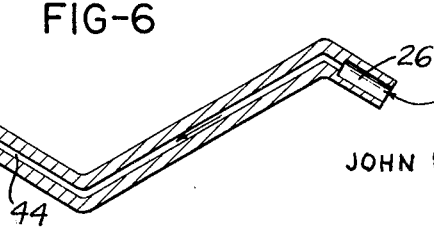
INVENTOR.
JOHN M. BREEN United States Patent Office 3,504,414
Patented Apr. 7, 1970

3,504,414
TOOL FOR INSERTING TIRE STUDS
John M. Breen, 15 Stratford Road, Ben Avon Heights, Pittsburgh, Pa. 15202
Filed July 17, 1967, Ser. No. 653,774
Int. Cl. B23p 19/00, 19/02, 19/04
U.S. Cl. 29—200
8 Claims

ABSTRACT OF THE DISCLOSURE

Tool for inserting tire studs in which the tool supports a stud and presents the stud head end foremost to a blind hole in a tire tread and at an angle thereto and causes the stud to take a nutating motion about the head end while the tool presses the stud toward the tire so the stud will be worked into the hole in the tread until the stud head seats on the bottom of the hole.

---

This invention relates to a tool apparatus for installing traction studs in tires.

The use of traction studs in vehicle tires, as well as in other places, is well known. The studs are mounted in the tires after the tires are cured because in this manner the blind hole, somewhat smaller than the diameter of the stud, can be formed in the tire and this hole expanded to receive the stud whereupon the tire will collapse around the stud and hold it firmly in position. Most studs have a single flange or head at the innermost end which is substantially larger than the hole for receiving the stud so that considerable expansion of the hole in the tread is necessary before the stud can be installed.

Some studs are formed with a tapering head on the side that is presented to the hole in the tread and this will permit studs of this nature to be installed in the hole provided therefor by lubricating the stud head, as by soap solution or the like, and pushing it into the hole. Studs having tapering heads, however, are not the preferred type and as a result, most commercial studs have fairly flat heads and this makes it difficult, if not impossible, to install them in holes merely by pushing. For studs having rather flat heads, the conventional practice is to insert a cluster of three pointed fingers into the hole in the rubber-like tire tread and then to push the stud head end foremost through the fingers which causes the fingers to separate and expand the hole whereby the stud will pass down to the bottom of the hole and the fingers can be withdrawn from the hole, leaving the stud in place. Such devices operate satisfactorily but are expensive and require a supply of compressed air for operation and, thus, are substantially limited in use to commercial establishments.

With the foregoing in mind, a primary object of the present invention is to provide a novel stud inserting tool by means of which studs can be inserted in tires quickly and relatively easily and without the use of an expensive gun requiring a supply of compressed air for its operation. Another object of this invention is the provision of a simple tire stud inserting tool which is extremely inexpensive so that it can be thrown away if it becomes defective for any reason. The foregoing objects of the present invention, as well as other objects and advantages thereof, will become more evident upon reference to the following specification taken in connection with the accompanying drawings in which:

FIGURE 1 is a schematic perspective view showing a portion of a tire and a stud being inserted therein by the use of a tool according to the present invention;

FIGURE 2 is a perspective view of one form which a tool, according to the present invention, can take;

FIGURE 3 is a perspective view of another form which the tool can take;

FIGURE 4 is a fragmentary view showing modification of the tool;

FIGURE 5 is a schematic view showing the manner in which the stud is presented to the hole provided therefor in the tire;

FIGURE 6 is a view showing the modification wherein the tool is tubular and has a fan mounted thereon to develop sub-atmospheric pressure within the tool; and FIGURE 7 shows a modification.

In referring to the drawinges somewhat more in detail, in FIG. 1, 10 represents a tire, any conventional type such as a pneumatic type as is used on road vehicles or tractors or a solid tire such as might be used on lift trucks in a factory or warehouse. Tire 10 is provided with holes 12 distributed over the tread according to any desired known pattern for receiving traction studs. A traction stud of the type adapted for being inserted in the holes is illustrated in FIG. 5 and will be seen to comprise a cylindrical shank 14 with a single flange or head 16 at one end and with a hard wear resistant pin 18 of cemented metal carbide mounted in the shank and projecting somewhat from the end thereof opposite head 16. FIG. 5 also illustrates a portion of tire 10 to show the size of hole 12 relative to the stud before the stud is mounted therein. Hole 12, will be seen, may have chamfered entrance region 20.

Return to FIG. 1, the tool according to the present invention for inserting the stud comprises a rod-like member 22 having one end adapted for gripping in chuck 24 of a hand drill or some other motor device for rotating the chuck. The stud is received in a socket in the end of the tool which is adjacent the tire in FIG. 1.

The socket referred to is indicated at 26 in FIGURES 2 and 3.

The tool will be seen to be a single rod-like element which may be, for example, a drill rod which is somewhat smaller in diameter than the flange or head on the stud, at least at the stud end of the tool. The straight portion 30 on the end of the tool opposite socket 26 is adapted for being received in the chuck of the driver while the intermediate portion of the tool has a lateral offset 32 therein. The end portion of the tool in which socket 26 is located is bent in such a manner that the axis of socket 26, indicated by line Y, diverges with the axis of rotation of the tool indicated by line X, in the outward direction away from the tool. It is also possible, however, for the axes to converge in the outward direction of the tool. The important thing is that the stud is held so that its axis is at an angle to the axis of the hole in the tread in which the stud is to be placed. The stud head then has one side nearer the mouth of the hole than the other side. The side of the stud nearest the hole is placed against the mouth of the hole and then, when the two are rotated while pressure is applied on the tool toward the tire, the stud will take a nutating motion and will be caused to work its way into the hole to seated position therein. It will be appreciated that the axis of the stud is held at an angle to the axis of the hole and that this can be done by causing the axis of bore 26 either to converge or diverge from the axis of rotation of the tool in the outward direction of the tool. In either case, when the tool is rotated, the stud is held against rotation by engagement with the tire tread and takes a nutating motion which, together with the pressure exerted on the stud by the tool, causes the stud to work its way into the hole in the tire tread.

The tool shown in FIG. 2 has the socket 26 offset laterally from the axis of rotation of the tool and this has proved to be of merit when the tool is rotated relatively slowly.

For more rapidly rotating tools, the modification of FIG. 3 may be employed. The tool shown in FIG. 3 has a straight bore 34 for gripping in the chuck of the driving tool, an intermediate offset portion 36 while the end portion containing the socket 26 is so disposed that the axis of socket 26 intersects the axis of straight bore 34 in the region of the mouth of the socket. In FIG. 3, X represents the axis of straight bore 34 and also the axis of rotation of the tool and Y represents the axis of socket 26.

In the use of either tool, it will be evident that the stud having its shank inserted in socket 26 to be presented to the hole that is to receive the stud at an angle as shown in FIG. 5. With one side of the stud head firmly seated in the mouth of the hole, the driving tool is actuated to rotate the tool and this will cause a somewhat gyratory, or nutating, motion of the stud and of the tool which will cause the stud to make somewhat of a threading motion and to feed into the hole until the head is seated on the bottom of the hole. Once the stud is seated on the bottom of the hole, the tool is tilted somewhat so that the socket end thereof is substantially aligned with the axis of the hole and the tool can then be withdrawn from the hole leaving the stud in place.

It is also proposed by the present invention to interpose a swivel joint 38 as shown in FIG. 4 in the tool adjacent the socket end thereof which will permit the portion of the tool having the socket therein to rotate relative to the other part of the tool thereby to prevent any damage to the rubber in which the stud is being inserted. Normally, of course, the stud end of the tool is smooth and polished and will inflict no damage on the rubber. Some friction develops between the tool and the rubber, however, so that by the provision of the swivel joint of FIG. 4, the tool runs more easily and there is no chance of overheating the rubber during the stud installing operation.

The tool may be made of solid drill rod and bored at one end to form the socket 26, or the tool may be made of tubing. Still further, when the tool is made of tubing, the passage therein can be availed of for providing a holding means for holding the stud in place in the stud end of the passage. This might be done as shown in FIG. 6 wherein there is mounted on the straight portion 40 of the tool illustrated a small fan 42 which develops a suction on passage 44 within the tool by way of the radial hole 46. Passage 44 on the chuck side of hole 46 is, of course, plugged to prevent loss of suction therethrough.

It will be understood that it is also possible to retain the stud in the end of the tool by magnetic means or by spring friction fingers or the like, if so desired.

The tool according to the present invention is extremely inexpensive to manufacture, is easy to use, and permits studs to be installed by anyone without the use of power equipment. The extremely low expense of the tool makes it economical to buy the tool for the installation of only a few studs.

The tool may also be rotated by gripping the end in a hand powered device instead of an electric or air pressure powered device.

FIG. 7 shows how the tool could be made by taking a length of rod 50, drill rod, for example, and bending off the end at 52 so as to present the stud to the tire tread at an angle of about 15°. This tool works in the same manner as the previously described tools but is simpler to make and is better balanced when rotating. The tool of FIG. 7 could be rotated faster than those of FIGS. 2 and 3 with less vibration.

All of the tools are preferably hardened at the stud end to obtain long wear. Further, any of the tools could include a rotating joint to prevent the stud end of the tool from rotating when in the tire although by polishing the stud end of the tool the possibility of damaging the tire tread would be reduced to a minimum, particularly when a lubricant, such as soap, was employed during stud insertion.

With regard to the nutating motion referred to, it will be understood that this refers to bodily motion of the tire stud without rotation thereof. Thus, with the head or flange of the tire stud seated against the tread rubber, the stud is prevented from rotating on its axis while the tool causes the stud to move in such a manner that the stud axis defines a cone with the base end of the cone toward the tool and the apex of the cone at or near the head end of the stud.

Modifications can be made to adapt the invention to various circumstances, and it is intended to include within the purview of this invention such modifications as fall within the scope of the appended claims.

What is claimed is:

1. A tool for inserting flanged tire studs in holes in a tire tread comprising; a rod-like element having means at one end for supporting and driving the element and establishing an axis of rotation for said element, said element having an axial bore in the other end to receive a tire stud shank end foremost with the stud free to rotate in said bore but being held against tilting therein, said element being smaller in diameter than the flange of the stud in at least the region adjacent the said other end thereof, said other end of said element being disposed angularly to the said axis of rotation of the element so as to support a stud in said bore with the axis of the stud at an angle to said axis of rotation, and said other end of said element being positioned close to said axis of rotation.

2. A tool according to claim 1 in which the said other end of the element diverges from said axis of rotation of the element in the direction outwardly from said other end of the element.

3. A tool according to claim 1 in which the axis of rotation of the element passes through the axis of the bore in said other end of the element near the plane of the outer tip of said other end of the element, and said other end of the element diverges from said axis of rotation in a direction toward said one end of the element.

4. A tool according to claim 1 in which said means at said one end of the element comprises a portion of the element adapted for being gripped in a rotary chuck.

5. In a tire stud inserting tool; means for supporting a flanged tire stud with the flange end thereof toward the tire tread in which the stud is to be mounted, means for presenting the flange on the stud to the hole in the tire tread which is to receive the stud with the plane of the flange at an angle to the axis of the hole, means for pressing the side of the flange nearest the tire against the edge of the hole in the tire, and means for causing the stud to take a nutating motion about the region of engagement of the stud flange with the tire whereby the stud is progressively forced into the hole into seated position in the said hole.

6. A tool according claim 1 in which the said element includes a rotary joint between the ends thereof so the said other end can be held stationary by frictional engagement with the tire tread while the said one end of the element is rotated.

7. A tool according to claim 1 in which said tool comprises a passage therein leading from said bore to near said one end of the tool, and means for developing a suction on said passage to hold a stud placed in said bore therein.

8. A tool according to claim 7 in which said means for developing suction comprises fan means mounted on said tool near said one end thereof and a hole leading from the suction side of said fan means through the tool into the said passage therein.

References Cited

UNITED STATES PATENTS

| 2,160,374 | 5/1939 | Veillette. | |
| 2,704,564 | 3/1955 | Christensen | 152—210 |
| 3,199,182 | 8/1965 | Harris et al. | 29—211 X |
| 3,388,451 | 6/1968 | Holder | 29—235 |
| 3,400,443 | 9/1968 | Miller | 29—400 |
| 3,403,435 | 10/1968 | Holder | 29—450 |

THOMAS H. EAGER, Primary Examiner

U.S. Cl. X.R.

29—235